(No Model.)

G. C. MOORE.
ENDLESS TUBULAR FABRIC.

No. 570,137. Patented Oct. 27, 1896.

Witnesses
Oscar F. Gill
A. G. Guhman

Inventor
George C. Moore
by Macleod Calver & Randall
Attorneys.

UNITED STATES PATENT OFFICE.

GEORGE C. MOORE, OF WORCESTER, MASSACHUSETTS.

ENDLESS TUBULAR FABRIC.

SPECIFICATION forming part of Letters Patent No. 570,137, dated October 27, 1896.

Application filed February 29, 1896. Serial No. 581,293. (No specimens.)

*To all whom it may concern:*

Be it known that I, GEORGE C. MOORE, a citizen of the United States, residing at Worcester, in the county of Worcester and State of Massachusetts, have invented certain new and useful Improvements in Endless Tubular Fabrics, of which the following is a specification, reference being had therein to the accompanying drawings.

The invention consists in an endless tubular fabric of an improved character, which is suitable for use in the construction of pneumatic and other tires for bicycles and other vehicles, and for similar purposes, the said fabric being made without cross-seam or splice.

The invention will be described first with reference to the accompanying drawings, after which the distinguishing characteristics thereof will be pointed out particularly and defined distinctly in the claims at the close of this specification.

Figure 1:
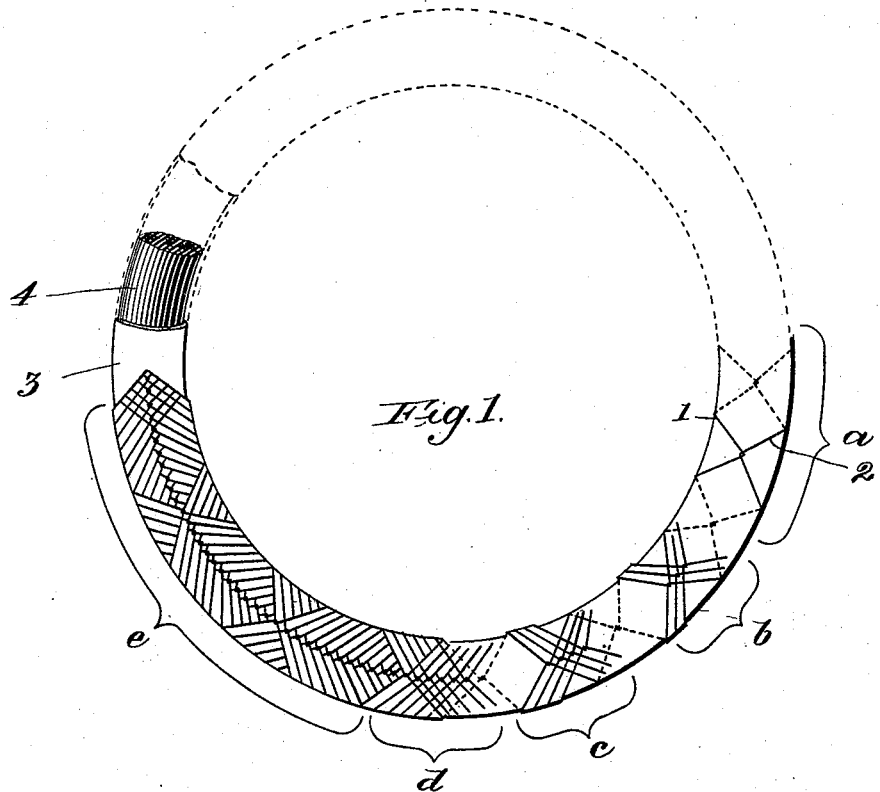
Figure 2:
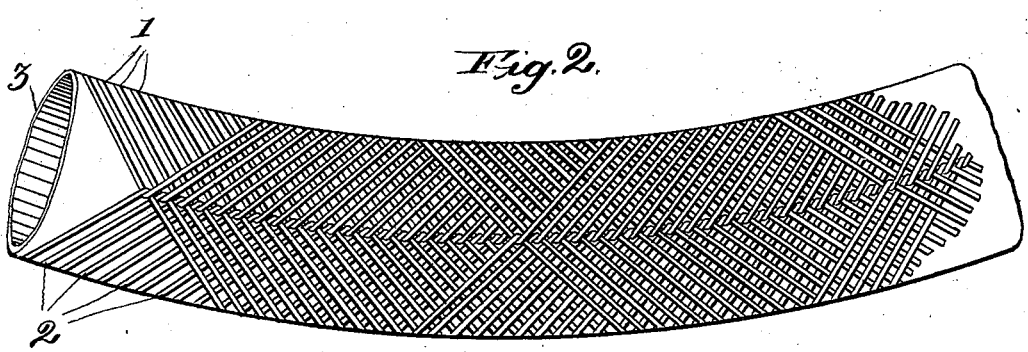
Figure 3:
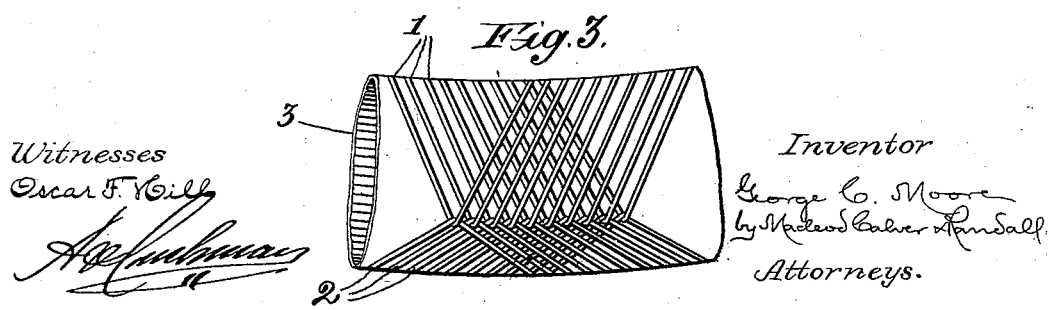

Figure 1 of the drawings is a view illustrating the character of my fabric and the mode of making the same. Fig. 2 is a view of a portion thereof on a larger scale. Fig. 3 is a view corresponding with Fig. 2, but showing a slight modification.

1 2 are the threads of which my fabric is formed. These threads extend around the circuit of the endless tubular fabric a repeated number of times in the form of a continuous or endless series or succession of overlapping courses. Each course comprises a sufficient number of threads to extend around the transverse circumference of the fabric. In each course the component threads thereof extend oppositely in zigzag directions, each thread passing part way only around the transverse circumference of the fabric, and the said component threads of each course interloop with each other along lines extending longitudinally in the fabric. Any number of threads may be used in a course, although in general I employ two threads, these two interlooping with each other, as just stated. The lines of interlooping may be located wherever desired in the fabric, as, for example, on the inner and outer circumferences of the endless fabric, although in the drawings the interlocking is shown as caused to occur at the sides of the fabric, that is to say, in the lateral portions of the fabric. As the successive courses proceed around the circuit of the endless fabric, each course in succession overlying the ones which preceded it in the process of formation, there is a constant advance or gain in the position of the threads, so that the threads lie regularly and the fabric is of uniform construction and thickness.

At 3 is indicated a tube of caoutchouc or like material, the said tube being inclosed by the fabric which is formed of the threads 1 2, the said threads being united to the surface of the tube, if desired, by means of a suitable elastic cement.

In practice, the fabric is formed upon the exterior of the tube, which constitutes a lining. The latter is distended, as by being inflated, or by means of a core 4, which is removed after the completion of the fabric. The removal of the said core may be effected by making the said core sectional and withdrawing it through a slit in the fabric and tube. Preferably, however, the said core is made of material capable of being melted or dissolved, and is removed or withdrawn through an opening that is provided for the application of the valve which is applied to the tire. Thus the said core may be made of paraffin or like material which is capable of being readily melted and withdrawn in the manner indicated. The fabric may, however, be formed directly upon a core of suitable character, which will be removed after the threads have been bound together by the application of suitable elastic cement.

In making my improved tubular fabric with a lining the said lining is either distended by air or the like or is applied to a suitable core 4, and the threads are then applied to the surface of the said lining. Having reference more particularly to Fig. 1, it will be seen that the threads 1 2 pass in opposite directions part way around the lining, meeting and interlooping with each other at opposite points on the said lining, each being returned in a reverse direction to the opposite side of the lining, where the interlooping is repeated. Single threads 1 and 2 may be applied in the manner stated; or, if desired, two or a similar small number of threads may be applied at a time, each of such threads in one group interlooping with the corresponding thread in the opposite group. A number of courses of the interlooped threads are required to complete the formation of the fabric, each course overlying the preceding courses and each course gaining slightly upon the last thereof. As shown at the right-hand side in Fig. 1, the successive portions of the thread in each course are somewhat widely spread apart, and as the threads pass in successive courses around the fabric the succeeding courses in turn overlie the preceding courses, as indicated by progressive steps in Fig. 1, until the entire surface of the core or lining is covered by a species of network consisting of threads each passing in zigzag manner part way around the transverse circumference of the lining, the said threads interlooping with each other along lines extending longitudinally in the fabric.

At $a$ in Fig. 1 are represented portions of a single course; at $b$ three courses are indicated; at $c$ four courses are indicated; at $d$ six courses are indicated, and at $e$ the completed series of courses is shown. The texture is most clearly shown in Fig. 2.

As indicated hereinbefore, the lines of interlooping may be located where desired in the fabric. In Figs. 1 and 2 I have represented the said lines as located diametrically opposite each other at the sides of the fabric. In Fig. 3 I have represented them as located nearer the outer periphery than in Fig. 2. The described construction of the fabric enables me to employ, when desired, a thread or threads 2 of a different material from the thread or threads 1. Thus the thread or threads 2 may be composed of elastic material, such as caoutchouc, either covered or uncovered with fibrous material, or the said thread or threads 2 may be of wool, worsted, or other elastic material, thus enabling me to form a pneumatic tire with a tread portion which will be less liable to become punctured than in the case of most of the existing tires.

In consequence of being produced of a continuous series of courses in which the same threads extend around the circuit of the ring a repeated number of times the fabric is endless and has no cross-seam or splice. It will of course be made to the required diameter to fit it for the use for which it is intended, and various sizes thereof will in practice be made.

While I have used the term "threads" herein, I wish it to be understood that I do not regard myself as being limited to any particular material, and in some cases may use wire.

I claim as my invention—

1. An endless tubular fabric having a succession of continuous courses of threads extending around the circuit of the same, the component threads of a course extending oppositely in zigzag directions and each thread passing only part way around the transverse circumference of the fabric, the said component threads of each course interlooping with each other along lines extending longitudinally in the fabric, and each course overlying the preceding courses and gaining upon the preceding course, as stated, substantially as described.

2. An endless tubular fabric consisting of an elastic lining, and a succession of continuous courses of threads extending around the circuit of the same, the component threads of a course extending oppositely in zigzag directions and each thread passing only part way around the transverse circumference of the fabric, the said component threads of a course interlooping with each other along lines extending longitudinally in the fabric, each course overlying the preceding courses and gaining upon the preceding course as stated, and the said threads being united to each other and to the lining by elastic cement, substantially as described.

3. An endless tubular fabric having a succession of continuous courses of threads extending around the circuit of the same, the component threads of a course extending oppositely in zigzag directions and each thread passing only part way around the transverse circumference of the fabric, the said component threads of a course interlooping with each other along lines extending longitudinally in the fabric, and each course overlying the preceding courses and gaining upon the preceding course, as stated, and the thread or threads at the outer periphery of the fabric being of an elastic nature, substantially as described.

In testimony whereof I affix my signature in presence of two witnesses.

GEO. C. MOORE.

Witnesses:
CHAS. F. RANDALL,
WM. A. MACLEOD.